(12) United States Patent
Lu et al.

(10) Patent No.: US 7,017,235 B2
(45) Date of Patent: Mar. 28, 2006

(54) DUAL-DIRECTIONAL HINGE

(75) Inventors: Sheng-Nan Lu, Shulin (TW); Hsiang-Chi Chien, Shulin (TW)

(73) Assignee: Shin Zu Shing Co., Ltd., Shulin (TW)

( * ) Notice: Subject to any disclaimer, the term of this patent is extended or adjusted under 35 U.S.C. 154(b) by 110 days.

(21) Appl. No.: 10/682,661

(22) Filed: Oct. 8, 2003

(65) Prior Publication Data

US 2005/0076474 A1  Apr. 14, 2005

(51) Int. Cl.
*E04G 3/00* (2006.01)

(52) U.S. Cl. .............................. 16/367; 16/280; 16/366; 16/342; 16/340; 248/278.1; 248/917; 248/928; 361/681

(58) Field of Classification Search ............... 16/280, 16/302, 287, 297, 282, 292, 366 X, 367, 16/377; 361/681, 683; 248/922, 917, 284.1
See application file for complete search history.

(56) References Cited

U.S. PATENT DOCUMENTS

| | | | | |
|---|---|---|---|---|
| 5,016,849 A | * | 5/1991 | Wu | 248/176.3 |
| 5,632,066 A | * | 5/1997 | Huong | 16/338 |
| 5,812,368 A | * | 9/1998 | Chen et al. | 361/681 |
| 5,913,351 A | * | 6/1999 | Miura | 16/340 |
| 6,019,332 A | * | 2/2000 | Sweere et al. | 248/284.1 |
| 6,154,925 A | * | 12/2000 | Miura | 16/338 |
| 6,256,837 B1 | * | 7/2001 | Lan et al. | 16/334 |
| 6,347,433 B1 | * | 2/2002 | Novin et al. | 16/367 |
| 6,378,830 B1 | * | 4/2002 | Lu | 248/278.1 |
| 6,427,288 B1 | * | 8/2002 | Saito | 16/361 |
| 6,522,530 B1 | * | 2/2003 | Bang | 361/681 |
| 6,581,893 B1 | * | 6/2003 | Lu | 248/291.1 |
| 6,601,810 B1 | * | 8/2003 | Lee | 248/278.1 |
| 6,742,221 B1 | * | 6/2004 | Lu et al. | 16/367 |
| 6,757,940 B1 | * | 7/2004 | Lu et al. | 16/330 |
| 6,798,646 B1 | * | 9/2004 | Hsu | 361/681 |
| 6,867,962 B1 | * | 3/2005 | Cho et al. | 361/681 |

\* cited by examiner

*Primary Examiner*—Suzanne Dino Barrett
*Assistant Examiner*—Mark Williams
(74) *Attorney, Agent, or Firm*—David A. Belasco; Belasco Jacobs & Townsley, LLP

(57) ABSTRACT

A dual-directional hinge for a portable device with a body and a monitor such as a mobile phone, a notebook computer or a PDA is disclosed. The hinge is composed of a first supporting member, a second supporting member, a seat, a vertical pin and a horizontal pintle. The first supporting member is mounted on the monitor and is rotatably mounted on the second supporting member by the vertical pin. The second supporting member and the seat are mounted rotatably on the body by the horizontal pintle. Thus, the monitor can be turned about the horizontal pintle to be raised from the body, and can be turned left or right about the vertical pin to change the horizontal viewing angle.

5 Claims, 7 Drawing Sheets

DUAL-DIRECTIONAL HINGE

BACKGROUND OF THE INVENTION

1. Field of the Invention

The present invention relates to a hinge for a portable device such as a mobile phone, a notebook computer, or a PDA (Personal Digital Assistant), and more particularly to a dual-directional hinge which can be rotated about a horizontal pintle and a vertical pin

2. Description of Related Art

A portable device such as a mobile phone, a notebook computer or a PDA (Personal Digital Assistant) generally has a body and a monitor (or panel) pivotally mounted on the body by a hinge.

With the conventional hinge, the monitor can be turned about only a horizontal axis to change the vertical viewing angle, and cannot be turned left or right to change the horizontal viewing angle.

Therefore, the invention provides a dual-directional hinge to mitigate or obviate the aforementioned problems.

SUMMARY OF THE INVENTION

The main objective of the present invention is to provide a dual directional hinge which can be turned about a horizontal axis and a vertical axis.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
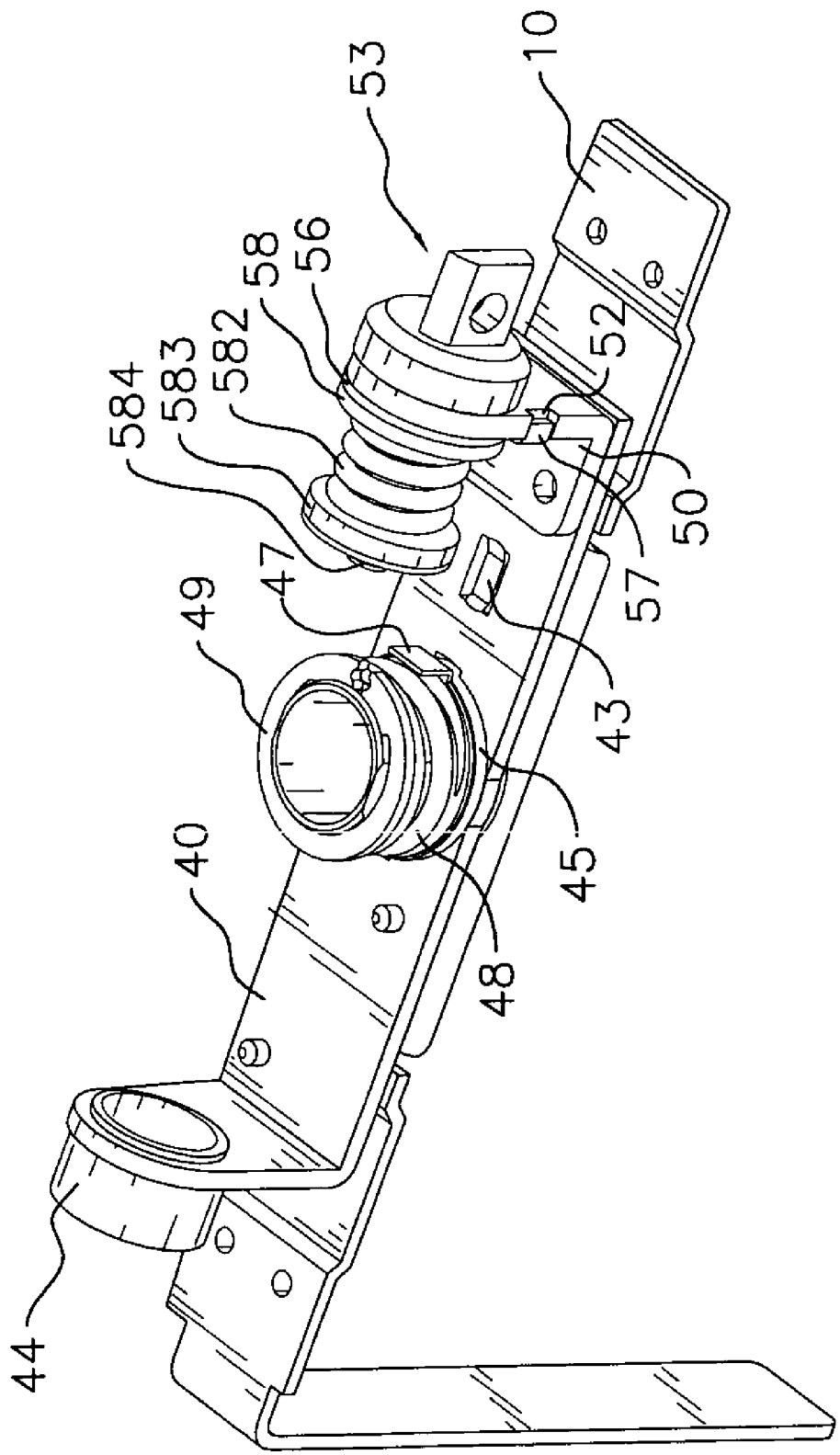
FIG. 1 is a perspective view of a dual-directional hinge in accordance with the present invention.
Figure 2:
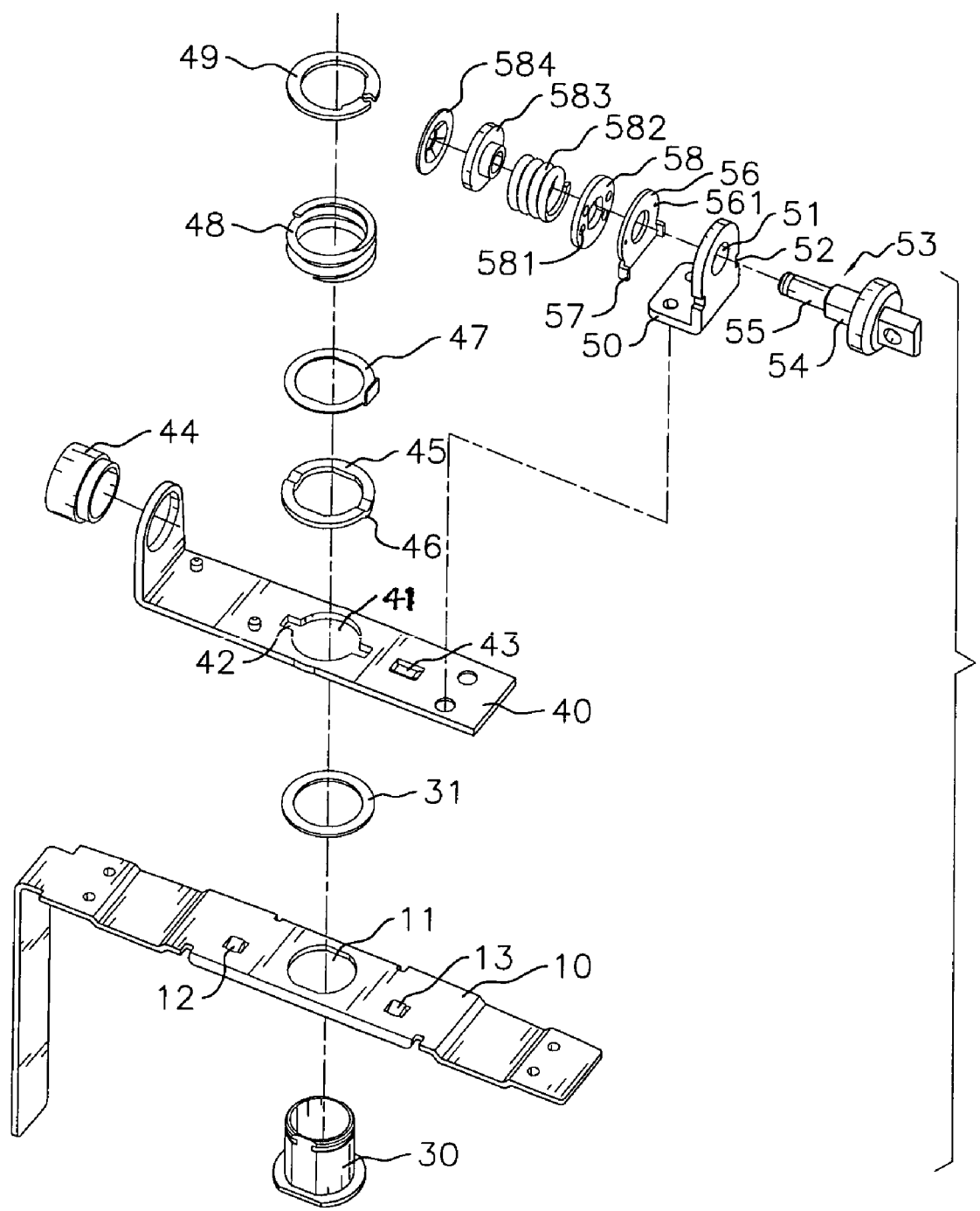
FIG. 2 is an exploded perspective view of the dual-directional hinge in FIG. 1.
Figure 3:
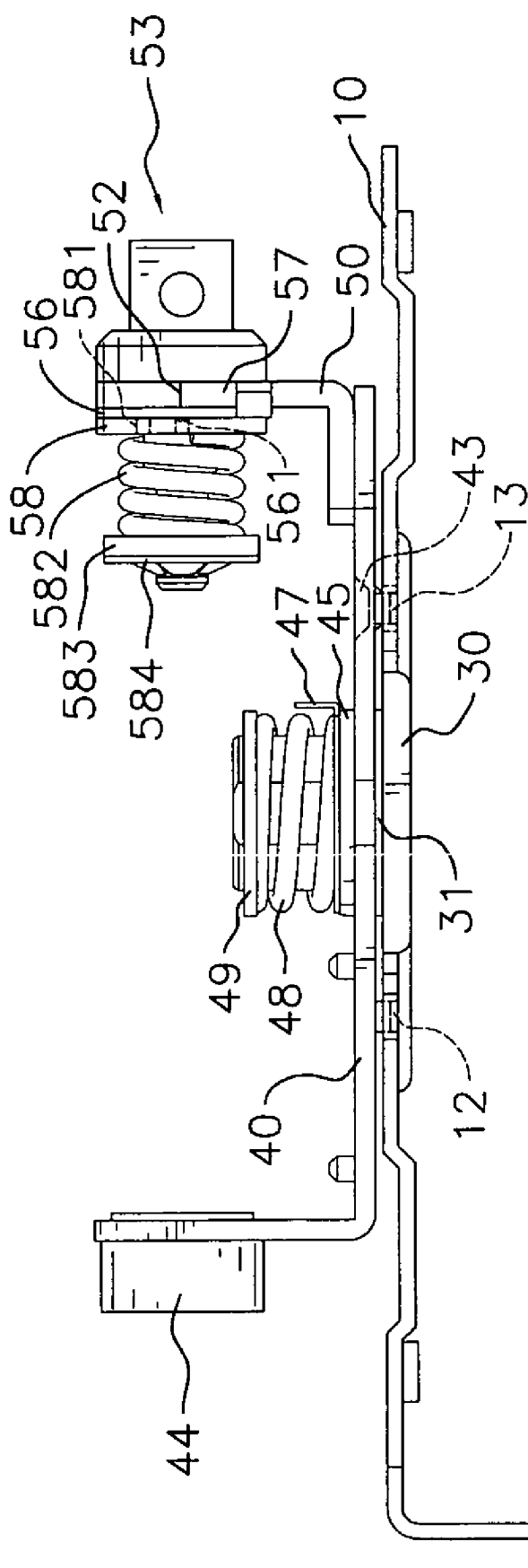
FIG. 3 is a front view of the dual-directional hinge in FIG. 1

With reference to FIGS. 1–4, a dual-directional hinge in accordance with the present invention can be used in a portable device with a body (20) and a monitor (60), such as a mobile phone, a notebook or a PDA.

The hinge has an L-shaped first supporting member (10) composed of a first upright arm (not numbered) and a first lateral arm (not numbered) perpendicular to the first upright arm. The first supporting member (10) is mounted under the monitor (60) of the portable device. A non-circular opening (11) is defined through the first lateral arm of the first supporting member (10). A first positioning lug (12) and a second positioning lug (13) are symmetrically formed at two diametrically opposite sides of the non-circular opening (11).

An L-shaped second supporting member (40) composed of a second upright arm (not numbered) and a second lateral arm (not numbered) perpendicular to the second upright arm is rotatably mounted on the body (20) of the portable device and on the first supporting member (10). A circular opening (41) is defined through the second lateral arm and aligned with the first non-circular opening (11). The second lateral arm further has two detents (42) defined respectively in and protruding radially out from two diametrically opposite sides of the circular opening (41) and in communication with the circular opening (41). A third positioning lug (43) is formed outside the circular opening (41) and aligned with the second positioning lug (13) on the first supporting member (10). A tube (44) is horizontally and rotatably inserted in the second upright arm and mounted on the body (20) of the portable device.

A vertical pin (30) with a non-circular cross section corresponding to the non-circular opening (11) is inserted through the non-circular opening (11) and circular opening (41) to rotatably install the second supporting member (40) on the first supporting member (10). A first washer (31) is mounted around the vertical pin (30) and between the first supporting member (10) and second supporting member (40).

A C-clip (49) is fastened at a distal end of the vertical pin (30) away from the first supporting member. A first resilient member (48) is mounted around the vertical pin (30) and between the C-clip (49) and the second supporting member (40). A positioning ring (45) is in mounted adjacent to the circular opening (41) around the vertical pin (30); and has an external edge and two protrusions (46) formed at two diametrically opposite sides of the external edge of the positioning ring and selectively engaging detents (42). A first resilient member (48) is mounted around the vertical pin (30) between the C-clip (49) and the positioning ring (45), and a second washer (47) is mounted around the vertical pin (30) between the first resilient member (48) and the positioning ring (45).

An L-shaped seat (50) composed of a third upright arm and a third lateral arm is mounted at a free end of the second lateral arm of the second supporting member (40). The third upright arm of the seat (50) has a front side, a rear side, a circular hole (51) and two notches (52). The circular hole (51) is defined through the third upright arm of the seat (50), and the two notches (52) are defined respectively at a front side and a rear side of the third upright arm of the seat (50).

A horizontal pintle (53) has a first part (not numbered), a second part and a flange. The first part of the horizontal pintle (53) extends through the circular hole (51) of the seat and has a distal end, a circular shaft (55) and a non-circular shaft (54). The circular shaft (55) has a diameter and is formed at the distal end. The non-circular shaft (54) has a diameter and is formed between the circular shaft (55) and the flange The diameter of the circular shaft is smaller the diameter of the non-circular shaft (54), and the non-circular shaft (54) is mounted in the circular hole (51) of the third upright arm of the seat (50). The second part is secured in the body (20) of the portable device, and the flange is formed between the first part and the second part.

A shaft clip (584) is fastened on the circular shaft (55). A third washer (56), a positioning disk (58), a second resilient member (582), and a fourth washer (583) are in turn mounted between the third upright arm and the shaft clip (584). The third washer (56) has a surface facing the positioning disk (58), two ears (57) located respectively in the notches (52) and two protrusions (561) formed in the surface facing the positioning disk (58). The positioning disk (58) is mounted around the non-circular shaft (54) for turning along with the horizontal pintle (53) and has multiple detents (581) to hold the protrusions (561) on the third washer (56).

Figure 4:
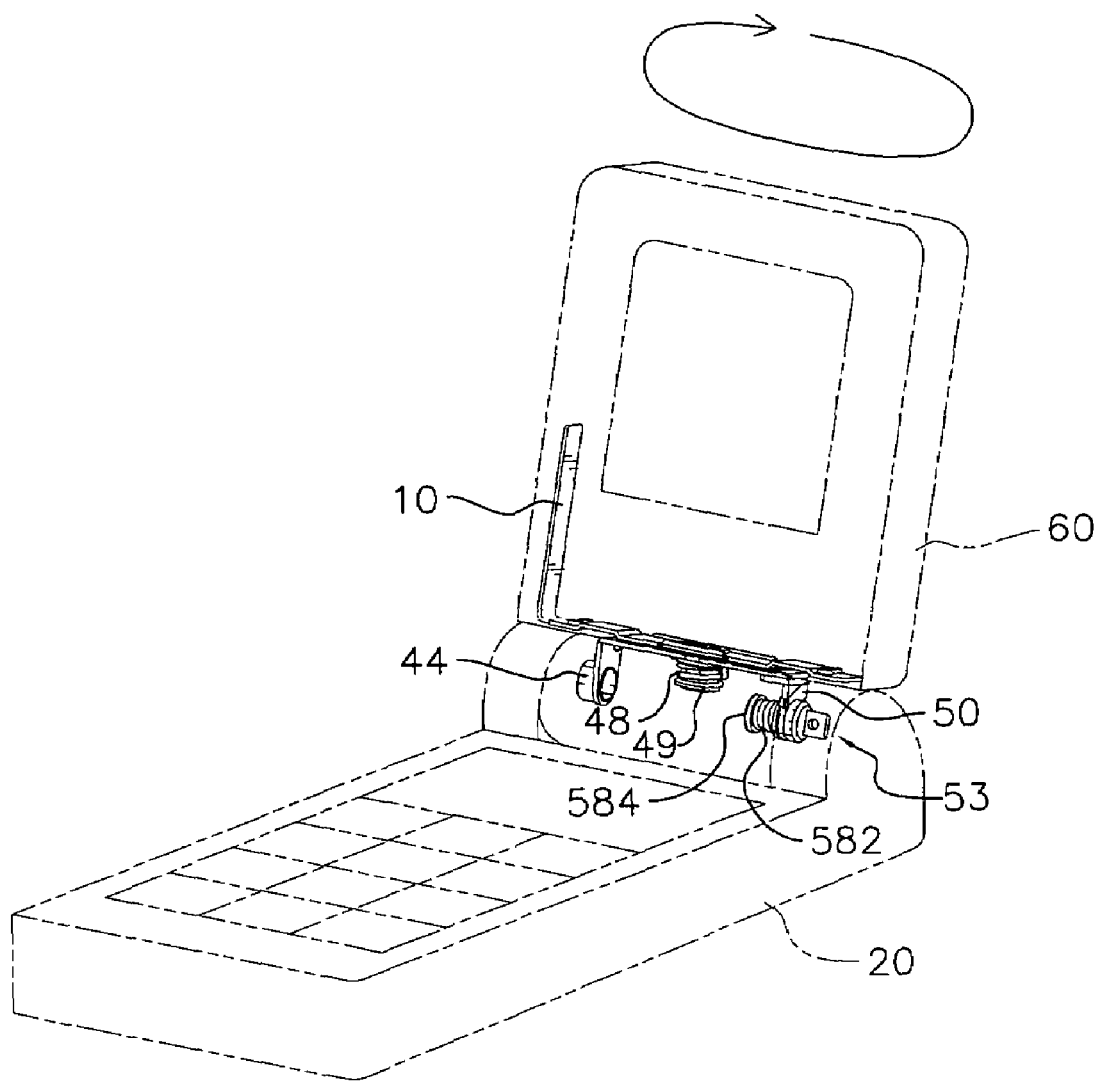
FIG. 4 is an operational perspective view of the dual-directional hinge in FIG. 1 installed on a portable device.
Figure 6:
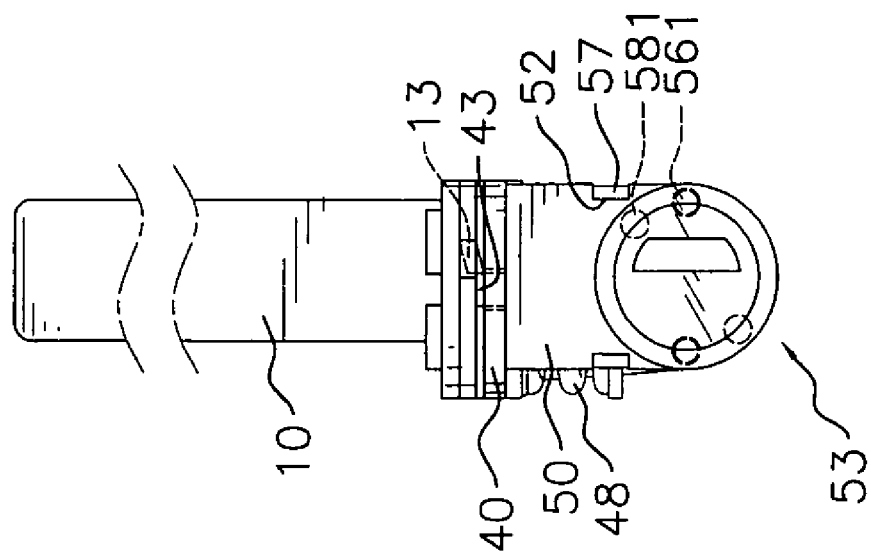
FIG. 6 is an operational side view of the dual-directional hinge in FIG. 5 being turned about a horizontal pintle.
Figure 5:
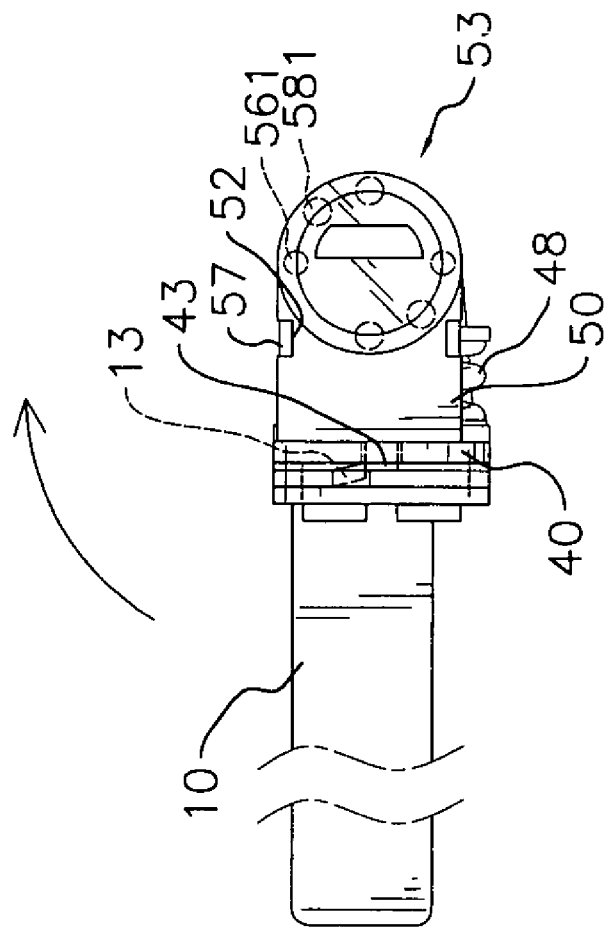
FIG. 5 is a side view of the dual-directional hinge in FIG. 1.

With reference to FIGS. 4–6, when a user raises the monitor (60), the second supporting member (40) along with the first supporting member (10) is rotated about the tube (44), and the seat (50) is rotated about the horizontal pintle (53), so the monitor (60) is turned about a horizontal axis extending through the tube (44) and the horizontal pintle (53). When the monitor (60) is in a certain position such as a vertical position, the protrusions (561) of the third washer (56) can be located in the corresponding detents (581) to hold the monitor (60) in position.

Figure 7:
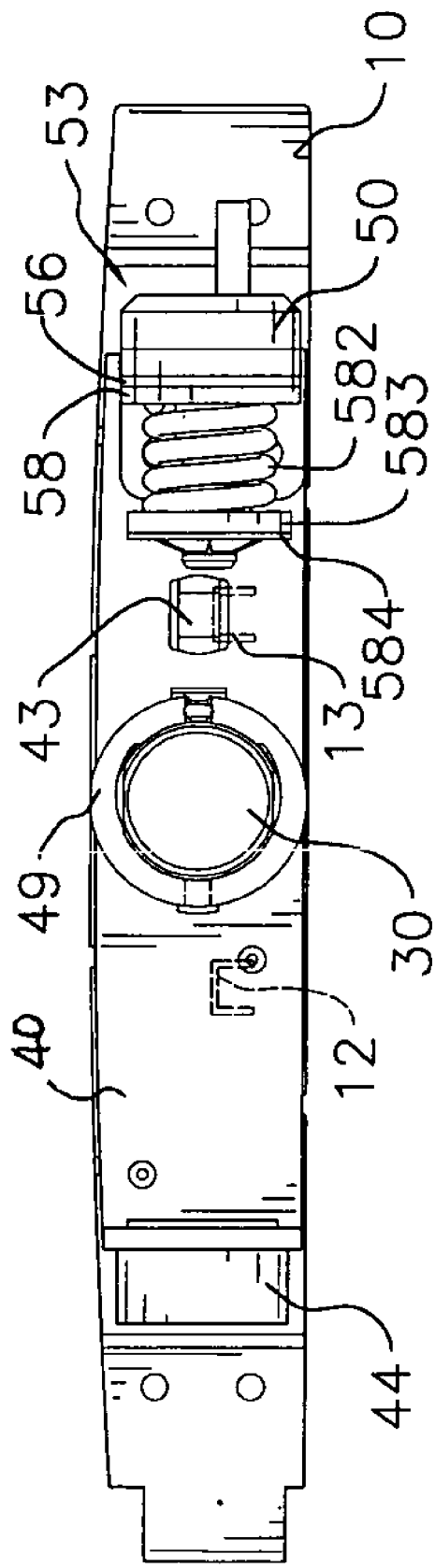
FIG. 7 is a top view of the dual-directional hinge in FIG. 1.
Figure 8:
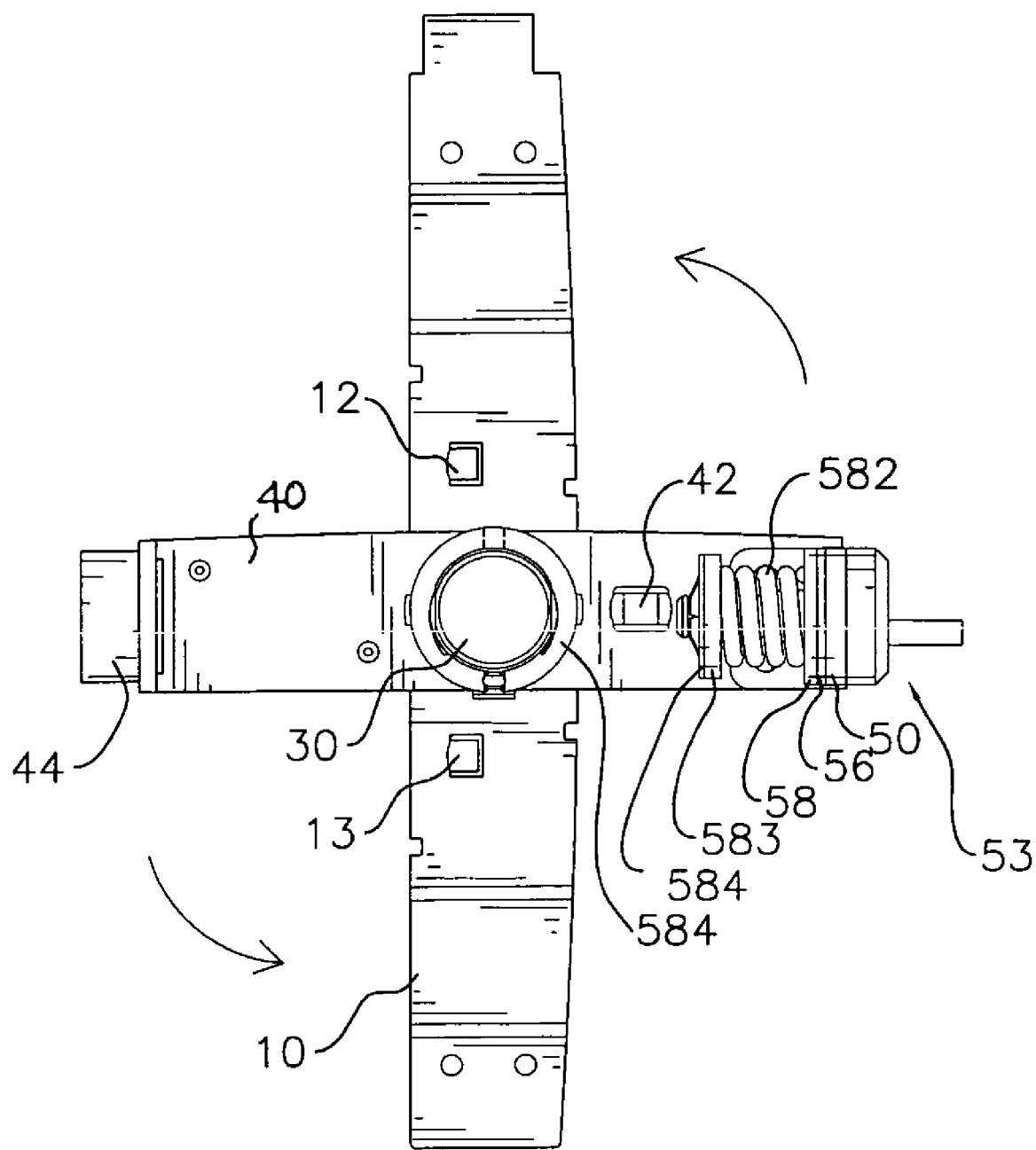
FIG. 8 is an operational top view of the dual-directional hinge in FIG. 7 being turned about a vertical axle vertical pin.

With reference to FIGS. 4, 7 and 8, when the monitor (60) is in the raised situation and is turned horizontally about the vertical pin (30), the first supporting member (10) along with the vertical pin is rotated about the second supporting member (40) and the seat (50) until the third positioning lug (43) abuts the first positioning lug (12) or the second positioning lug (13). Therefore, the horizontal viewing angle of the monitor (60) is changed.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A dual-directional hinge comprising:
    a first supporting member having a first upright arm, a first lateral arm perpendicular to the first upright arm and a non-circular opening defined through the first lateral arm;
    a vertical pin with a non-circular cross section extending through the non-circular opening of the first supporting member and having a distal end;
    a C-clip fastened at the distal end away from the first supporting member;
    a second supporting member having a second upright arm, a second lateral arm perpendicular to the second upright arm, the second lateral arm having a distal end and a circular opening defined through the second lateral arm wherein the vertical pin extends through the circular opening to enable the first supporting member along with the vertical pin to rotate about the second supporting member;
    a seat having a third lateral arm mounted on the distal end of the second lateral arm, a third upright arm perpendicular to the third lateral arm, a circular hole defined through the third upright arm and two notches defined at two sides of the circular hole;
    a horizontal pintle having a flange having a distal end and a proximal end, a first part formed on the distal end of the flange, rotatably extending through the circular hole of the seat and having a distal end, a non-circular shaft formed on the distal end of the first part and a circular shaft portion formed on an end of the non-circular shaft portion, a second part formed on the proximal end of the flange, a shaft clip fastened to the distal end of the first part, a third washer having two ears located respectively in the notches, a positioning disk mounted around the non circular shaft portion, a second resilient member, and a fourth washer each in turn provided between the seat and the shaft clip.

2. The dual-directional hinge as claimed in claim 1, wherein:
    the third washer has at least one protrusion formed on a surface facing the positioning disk and the positioning disk;
    the positioning disk has a surface facing the third washer and multiple detents defined in the surface facing the third washer to hold the at least one protrusion.

3. The dual-directional hinge as claimed in claim 1, wherein: the vertical pin has a first washer mounted around the vertical pin between the first supporting member and second supporting member; and
    the second supporting member has two detents defined at and protruding radially out from diametrically opposite sides of the circular opening, a positioning ring mounted adjacent to the circular opening around the vertical pin, an external edge and two protrusions formed at two diametrically opposite sides of the external edge of the positioning ring selectively engaging the detents protruding from the circular opening, a first resilient member mounted around the vertical pin between the c-clip and the positioning ring and a second washer mounted around the vertical pin between the first resilient member and the positioning ring.

4. The dual-directional hinge as claimed in claim 1, wherein:
    the first supporting member has a first lug and a second lug formed on the first lateral arm and symmetrically at two diametrically opposite sides of the non-circular opening; and
    the second supporting member has a third lug formed on the second lateral arm and aligned with the second lug.

5. The dual-directional hinge as claimed in claim 1, wherein the second supporting member further has a tube rotatably mounted in the second upright arm.

* * * * *